United States Patent [19]

Ishii

[11] Patent Number: 4,812,196
[45] Date of Patent: Mar. 14, 1989

[54] APPARATUS FOR STICKING RUBBER SHEET MATERIAL

[75] Inventor: Ryutaro Ishii, Tokyo, Japan

[73] Assignee: Bridgestone Corporation, Tokyo, Japan

[21] Appl. No.: 106,691

[22] Filed: Oct. 13, 1987

[30] Foreign Application Priority Data

Oct. 13, 1986 [JP] Japan .................................. 61-241461

[51] Int. Cl.⁴ ...................... B29D 30/24; B29D 30/28
[52] U.S. Cl. .................................... 156/412; 156/414; 156/421
[58] Field of Search ............... 156/405.1, 421, 405.1, 156/421, 414, 408, 412, 413

[56] References Cited

U.S. PATENT DOCUMENTS 3,007,511 11/1961 Barns et al. ..................... 156/421
4,409,872 10/1983 Bertoldo ....................... 156/405.1

Primary Examiner—Willard Hoag
Attorney, Agent, or Firm—Sughrue, Mion, Zinn, Macpeak & Seas

[57] ABSTRACT

Disclosed herein is an apparatus for sticking a rubber sheet material to a building drum which comprises a presser to secure the forward end of the rubber sheet material, said presser being provided at both ends thereof with attracting means and being covered with a sponge material except end parts, and a means to move the presser to the forward end of the rubber sheet material and place the presser on the rubber sheet material while the rubber sheet material is being stuck to the building drum and finally separate the presser from the building drum after the sticking is completed.

3 Claims, 3 Drawing Sheets

APPARATUS FOR STICKING RUBBER SHEET MATERIAL

BACKGROUND OF THE INVENTION

1. Field of the Invention:

The present invention relates to an apparatus for sticking a rubber sheet material to a building drum.

2. Description of the Prior Art:

According to the conventional technique for sticking a rubber sheet material to a building drum, the forward end of the sheet is secured to the drum by means of a vacuum pad built into the drum, pine resin applied to the drum surface, or the rubber's own stickiness.

The conventional technique, however, does not permit the forward end of a rubber sheet material to be secured to the building drum if the sheet material has a rough surface, a heavy weight, or a curved surface (hence a small contact area). This makes it impossible to stick a rubber sheet material firmly to a building drum.

SUMMARY OF THE INVENTION

The present invention was completed to address the problems involved in the prior art. According to the present invention, the problems are solved by providing the building drum with a presser which presses the forward end of a rubber sheet material against the building drum. The presser is provided at both ends thereof with magnets which bring the presser close to the building drum and is connected to the mechanism to separate the presser from the building drum after the sticking of the rubber sheet material is completed. The presser is covered with a sponge material to firmly press the rubber sheet material against the building drum. In the case where the surface of the building drum is not made of iron, the magnets may be replaced by proper pieces having a smooth surface and the building drum may be provided with built-in vacuum pads which mate with the pieces.

According to the present invention, the rubber sheet material is stuck to the rotating building drum while the forward end thereof is being pressed against the building drum by the presser. Therefore, the rubber sheet material can be stuck easily and accurately to the building drum at a desired position regardless of the surface state, shape, and weight of the rubber sheet material.

DETAILED DESCRIPTION OF THE INVENTION

Figure 1:
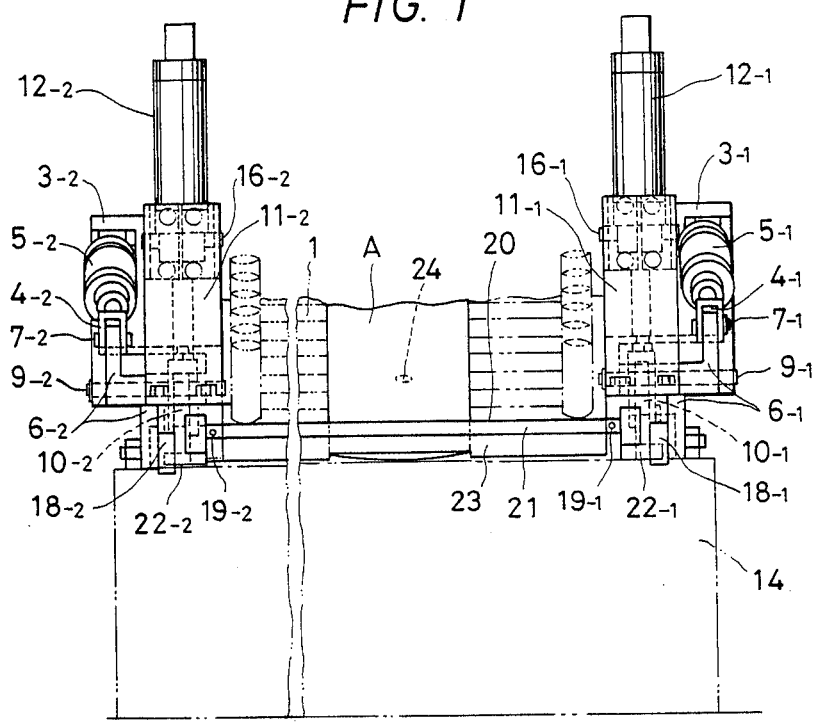
FIG. 1 is a front view showing one embodiment of the present invention.
Figure 2:
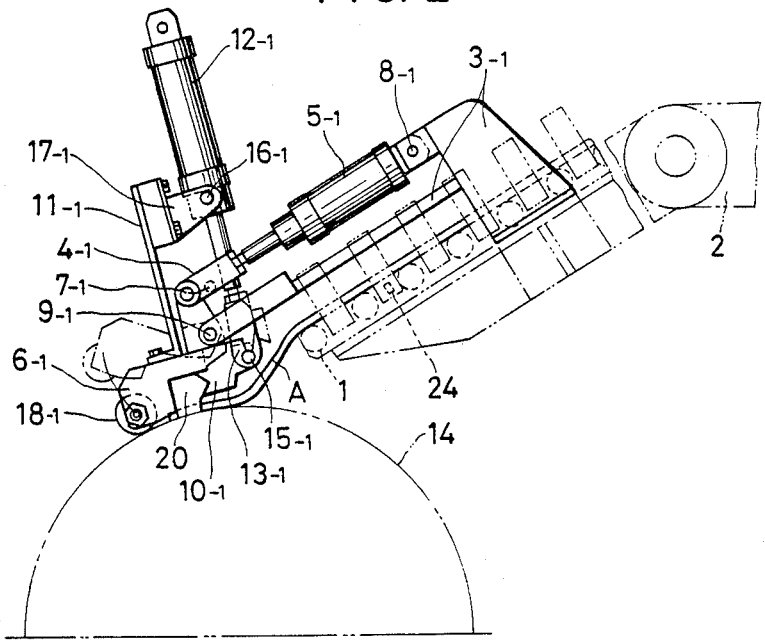
FIG. 2 is a side view of the same embodiment as shown in FIG. 1.

The invention will be described with reference to an embodiment shown in FIGS. 1 and 2, in which there is shown a supply conveyor 1 attached to the server 2. To both the side frames of the supply conveyor 1 are fixed the brackets 3-1 and 3-2. To the brackets 3-1 and 3-2 are rotatably attached at the upper side thereof the cylinders 5-1 and 5-2 through the pins 8-1 and 8-2 respectively. The cylinders 5-1 and 5-2 have at the other end thereof the cylinder rod end fittings 4-1 and 4-2, respectively. To the cylinder rod end fittings 4-1 and 4-2 are rotatably attached the chuck frames 6-1 and 6-2 through the pins 7-1 and 7-2, respectively. To the forward ends of the middle sides of the brackets 3-1 and 3-2 rotatably attached the chuck frames 6-1 and 6-2 through the pins 9-1 and 9-2, respectively. The chuck frames 6-1 and 6-2 swing toward the drum or away from the drum around the pins 9-1 and 9-2, which are positioned by the cylinders 5-1 and 5-2, the cylinder rod end fittings 4-1 and 4-2, and pins 7-1 and 7-2.

To the chuck frames 6-1 and 6-2 are fixed at the center top thereof the brackets 11-1 and 11-2. To the brackets 11-1 and 11-2 are fixed at the upper side thereof the brackets 17-1 and 17-2, respectively. To the brackets 17-1 and 17-2 are rotatably attached the cylinders 12-1 and 12-2 through the pins 16-1 and 16-2. The cylinders 12-1 and 12-2 have the cylinder rod end fittings 13-1 and 13-2, to which are rotatably attached the chuck claws 10-1 and 10-2 through the pins 15-1 and 15-2. The chuck claws 10-1 and 10-2 are rotatably mounted on the chuck frames 6-1 and 6-2 through the pins 9-1 and 9-2, respectively.

The movement of the chuck claws 10-1 and 10-2 through the cylinders 12-1 and 12 2, the cylinder rod end fittings 13-1 and 13-2, and the pins 15-1 and 15-2, causes the presser 20 to turn around the pins 9-1 and 9-2, thereby holding or releasing the object.

To the chuck frames 6-1 and 6-2 are rotatably mounted at the lower end thereof the rollers 18-1 and 18-2 which keep the chuck frames 6-1 and 6-2 a certain distance away from the building drum 14. The chuck frames 6-1 and 6-2 are provided with the sensors 19-1 and 19-2 which detect the presser 20. The presser 20 has the holder 21, the magnets 22-1 and 22-1 and the sponge material. The magnets 22-1 and 22-2 are located at both ends of the holder 21. The sponge material 23 covers with the holder 21 except the magnets 22-1 and 22-2. The magnets cause the presser 20 to press the rubber sheet material A against the building drum 14. The movement of the chuck claws 10-1 and 10-2 and the chuck frames 6-1 and 6-2 causes the presser 20 to rest on or separate from the building drum.

Figure 3A:
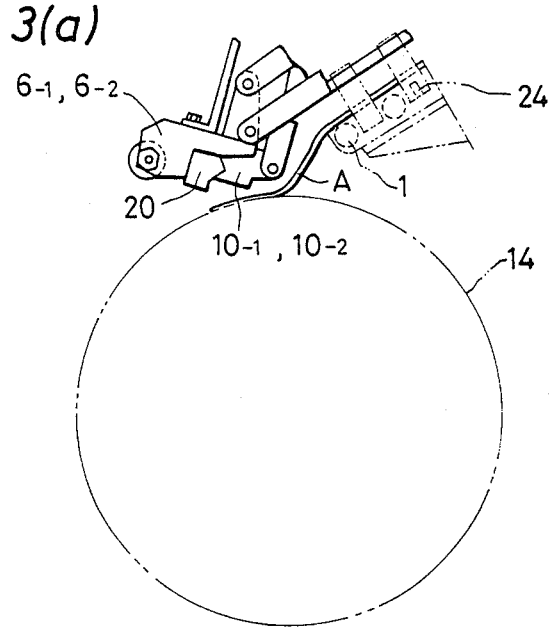
FIG. 3(a) to 3(d) are side views to illustrate the movements of the major parts.
Figure 3B:
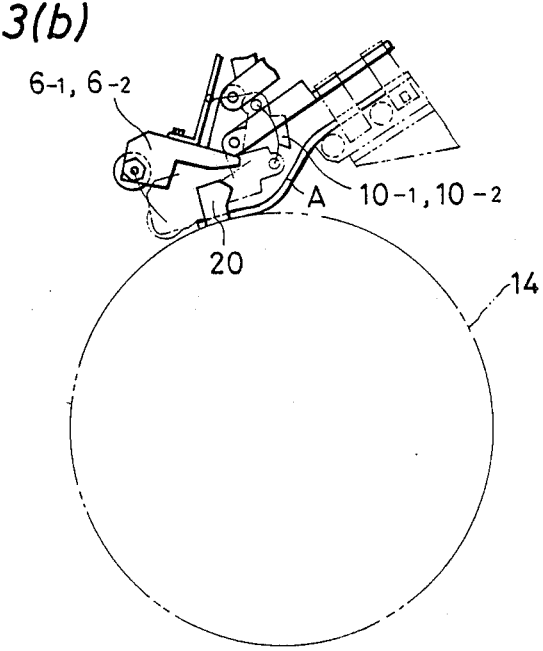
Figure 3C:
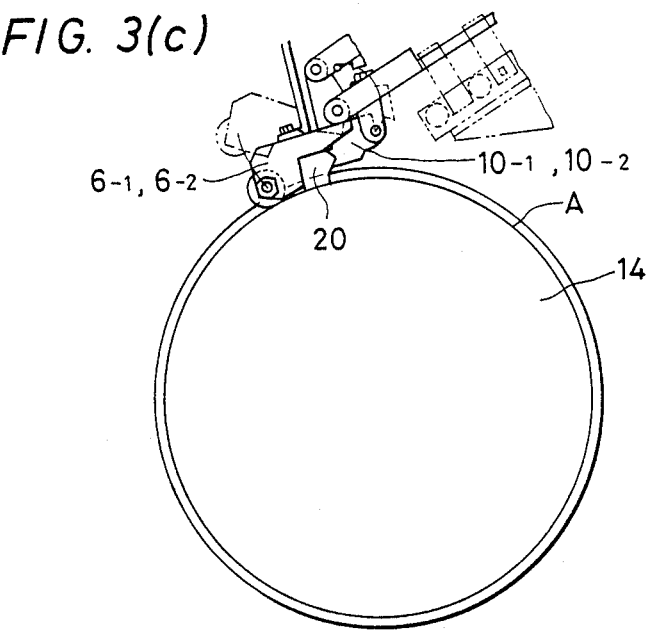
Figure 3D:
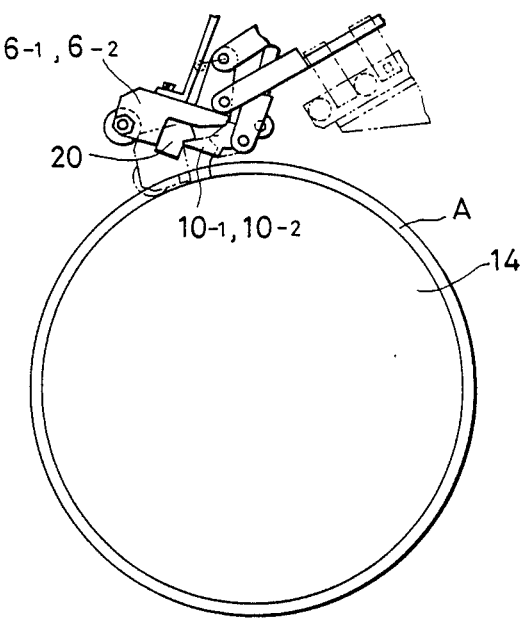

The apparatus of the presnt invention works as explained in the following description. At the beginning of operation, the presser 20 is held above the building drum 14 by the chuck claws 10-1 and 10-2, as shown in FIG. 3(a). As the rubber sheet material A cut to a desired length is fed by the supply conveyor 1, the sensor 24 detects the rubber sheet and actuates the timer. As the forward end of the rubber sheet material A comes into contact with the building drum, the timer stops. Simultaneously, the cylinders 5-1 and 5-2 move the chuck frames 6-1 and 6-2 downward and the magnets 21-1 ahd 21-2 are attracted to the drum surface. Thus the sponge material 23 covering the presser 20 pushes the forward end of the rubber sheet material A against the building drum 10. Subsequently, the cylinders 12-1 and 12-2 come into operation to move the chuck claws 10-1 and 10-2 upward, thereby releasing the presser 20. At the same time, the cylinders 5-1 and 5-2 work to move the chuck frames 6-1 and 6-2 upward, and the presser 20 rests on the building drum as shown in FIG. 3(b). Then, the drive motor (not shown) for the building drum starts to turn the building drum for a single revolution, completing the sticking of the rubber sheet material A. The cylinders 5-1 and 5-2 work to lower the chuck frames 6-1 and 6-2. Upon contact with the presser 20, they actuate the sensors 19-1 and 19-2, which in turn start the cylinders 12-1 and 12-2 which lower the chuck claws 10-1 and 10-2. Now, the presser 20 is held by the chuck claws 10-1 and 10-2 as shown in FIG. 3(*c*). Finally, the cylinders 5-1 and 5-2 disengage the presser 20 upward from the building drum 20. Thus a series of movements to stick the forward end of the rubber sheet material A is completed, and the above-mentioned steps are repeated as the next rubber sheet material is fed to the building drum by the supply conveyor 1.

In the case where the building drum does not have an iron surface, the magnets may be replaced by proper pieces having a smooth surface and vacuum pads may be built into the building drum at both ends thereof, so that the presser is attracted toward the building drum by vacuum force.

What is claimed is:

1. An apparatus for sticking a rubber sheet material, comprising: a building drum, a presser to secure a forward end of the rubber sheet material to said drum, said presser being provided on both ends thereof with means to attract the presser to said drum, a sponge material covering said presser except end parts thereof, and means to more the presser to the forward end of the sheet material and place the presser on the sheet material while the rubber is being stuck to the building drum and to finally separate the presser from the building drum after sticking is completed.

2. An apparatus for sticking a rubber sheet material to a building drum as claimed in claim 1, wherein the attracting means at the both ends of the presser are magnets and the building drum has the iron surface.

3. An apparatus for sticking a rubber sheet material to a building drum as claimed in claim 1, wherein the attracting means at the both ends of the presser are pieces having a smooth surface and the building drum is provided with built-in vacuum pads with mate with the pieces.

* * * * *